United States Patent Office 3,795,575
Patented Mar. 5, 1974

3,795,575
CELLULOSIC SHEET MATERIAL AND PROCESS FOR ITS PREPARATION
Lam H. Gouw, Delft, Netherlands, assignor to Shell Oil Company, New York, N.Y.
No Drawing. Filed May 2, 1972, Ser. No. 249,587
Claims priority, application Netherlands, May 3, 1971, 7105985
Int. Cl. D21h 5/12
U.S. Cl. 162—146                    3 Claims

ABSTRACT OF THE DISCLOSURE

A cellulosic sheet material (paper) which exhibits improved wet strength comprises about 5–75% by weight polymer fibers obtained by fibrillating a cold-stretched multilayered film comprising two or more layers of different polymer compositions and 25–95% by weight cellulosic fibers. The novel cellulosic sheet material is made by incorporating the polymer fibers into the cellulosic fibers then heating to a temperature above the melting point of the lowest melting polymer but below the temperature of the highest melting polymer. This cellulosic sheet material is used in the preparation of paper articles.

BACKGROUND OF THE INVENTION

Field of the invention

Ever since paper was first invented by Ts'ai Lun over 2000 years ago there have been constant improvements in the method of production and in the composition of paper. The instant invention is a further improved paper composition which exhibits surprisingly improved wet tear strength and is also a process for making the novel composition.

Prior art

This invention resulted from the combination of two technologies—the making of fibers from film and the making of paper.

It is generally known (U.S. patent specification 2,185,- 789) to produce fibers from a synthetic thermoplastic polymer by first making a film from the polymer, subjecting this film to unidirectional cold stretching (i.e., at a temperature below the melting point of the polymer), and mechanically fibrillating. During the stretching (known as longitudinal stretching) the polymer molecules in the film are oriented in the direction of stretch, which results in an increase in strength of the film in the direction of stretch and a decrease in strength in the direction perpendicular thereto. This makes it relatively easy for the film to split in the direction of stretch, thus permitting fibrillation of the film by a mechanical treatment.

Originally, this process did not find much acceptance in practice. However, since the discovery of polypropylene (in particular isotactic polypropylene) the process has been used on a larger scale because stretched polypropylene film lends itself particularly well to mechanical fibrillation. When stretched to a high degree, polypropylene film sometimes even fibrillates spontaneously without any further mechanical treatment being required.

The keener interest in film fibrillation has resulted in many improvements and refinements of the process, such as the use of special fibrillators and fibrillation methods (French patent specifications 1,556,787 and 2,020,718), and of profiled films as starting material [German "Offenlegungsschriften" (published unexamined applications) 1,917,822, 2,031,304 and 2,031,338], in which spontaneous fibrillation often occurs during stretching.

The resulting fibrillate may consist of individual fibers but is usually a network of more or less coherent fibers.

The fibrillate can be reduced to staple fiber by cutting or breaking it into fibers of the desired length. Staple fiber may also be made by first cutting the stretched film into pieces of the desired length and then fibrillating the film pieces.

Alternatively, the fibrillate may be converted into a fleece. It is possible, for example, to place a few layers of a network on each other and to work them with needles or pins (see for example British patent specification 1,202,829). A fleece may also be obtained by passing staple fiber through a carding machine.

Instead of being a single film, the starting material used may also be a laminate (multilayered) film, i.e., a film comprising at least two layers of different polymer composition. See for example British patent specification 1,181,249 and German "Offenlegungsschrift" (published unexamined application) 2,019,815.

It is also generally known that paper is manufactured from cellulose fibers by forming a sheet on a wire screen from dilute water suspension and removing the water from the matted fiber on the screen by various methods (see Kirk-Othmer Encyclopedia of Chemical Technology, 2d ed., vol. 14, Interscience Publishers, New York, 1967, pp. 494–509).

In a dry paper, the cellulose fibers display a certain coherence, as a result of which the paper has a certain strength. When paper gets wet, most of the coherence of the cellulose fibers disappears, resulting in a considerable decrease in strength. Efforts have been made to improve the strength of paper by the incorporation therein of homogeneous polymer fibers (monocomponent fibers such as polypropylene but attempts have been generally unsuccessful). Since there is hardly any coherence between the polymer fibers and the cellulose fibers, it is also necessary to incorporate into the paper a relatively large quantity (20% by weight or more) of a binder, such as an acrylate resin.

A non-woven fabric having improved wet strength, said fabric comprising cellulose fibers (cotton) and polypropylene fibers, has been made by forming a web of the two and heating the softened polypropylene fibers and applying pressure to partially fuse the polypropylene fibers where they contact each other (U.S. 3,501,369). However, it was found that when this was attempted in the manufacture of paper (i.e., polypropylene and cellulose in an aqueous suspension) there was not any improvement in wet tear strength over dry tear strength.

Surprisingly, it has now been found that according to this invention a fibrillate obtained from a multilayered polymer film used to reinforce paper made in the conventional way from cellulose fibers results in a paper product which exhibits improved wet tear strength. To this end the fibrillate is incorporated in the paper in such a manner that the fibers are arranged in random directions, thus forming a large number of "cross-over points" between the polymer fibers. On subsequent heating to a temperature lying above the melting point of the lowest melting polymer and below the melting point of the highest melting polymer, the fibers are fused together at the crossover points to form a network with fixed cross-over points. Thus, it is not necessary to use any kind of a binder if use is made of the process according to this invention, in which non-homogeneous fibers, i.e., fibers comprising two or more layers of different polymer compositions (by- or multicomponent fibers) are employed. Admittedly, resulting coherence between the polymer fibers and the cellulose fibers is not very strong, but this is unnecessary because the ultimate fiber network with fixed cross-over points has a certain strength of its own.

SUMMARY OF THE INVENTION

This invention is a cellulosic sheet material which exhibits improved wet tear strength comprising from about 5 to 75% by weight polymer fibers obtained by fibrillation of a cold-stretched multilayered film comprising two or more layers of different polymer compositions and from about 25 to 95% by weight cellulosic fibers.

This invention is also a process for the production of the cellulosic sheet material. The process comprises (a) incorporating polymer fibers obtained by fibrillation of a cold stretched multilayered film comprising two or more layers of different polymer compositions into cellulosic fibers and (b) heating the resulting combination of fibers at a temperature above the melting point of the lowest melting polymer and below the melting point of the highest melting polymer.

PREFERRED EMBODIMENTS

The product

Cellulosic sheet material of this invention includes products generally referred to as paper, paper board and construction paper and board. Paper is generally understood to be sheet material which is made up of many small discrete cellulose fibers bonded together. In this invention, the cellulosic sheet material is modified by the presence of polymer fibers obtained by fibrillation of a cold stretched multilayered film comprising two or more layers of different polymer compositions. These fibers are generally prepared as described in U.S. Pat. 3,582,418 and to the extent that it is pertinent that patent is incorporated here by reference. It will be appreciated that different polymer compositions used to produce the multilayered film will generally have different melting points.

A multilayered film to be used in this invention comprises at least two dissimilar coextensive layers intimately adhering to each other.

It is important for the layers in the multilayered films to adhere well to each other so that this adhesion is not lost during the fibrillation and also that most of the fibers consist of two layers. A good adhesion is normally encountered between macromolecular thermoplasts which resemble each other chemically. Examples of combinations of thermoplasts which adhere well together are: nylon 6 with nylon 66; the polyester of glycol and terephthalic acid and the polyester of glycol and isophthalic acid; polypropylene with random copolymers of propylene and ethylene; polypropylene with block copolymers of propylene and ethylene; propylene with a block copolymer containing blocks of polypropylene and blocks of a random copolymer of propylene and ethylene; polymethylacrylate with polymethylmethacrylate, polyvinylacetate with polyvinyl propionate; polyvinyl chloride with polyvinylidene chloride; cyclized rubber with polyolefins; cyclized rubber with polymer from pivalolactone; and cyclized rubber with polyvinyl chloride. A sufficient adhesion is present between polyethylene and polypropylene in laminates obtained by joint extrusion in the process known as the film-blowing process.

A very suitable combination for the preparation of the fibrillate used in this invention is a multilayered film made from polypropylene and polyethylene, in particular low-density polyethylene as obtained by the well-known "high-pressure process." The melting points of these materials are 170° C. and 120° C., respectively, and lie sufficiently wide apart to make the process according to the invention easy to carry out. The heat treatment may be effected at approximately 130° C.–140° C., which leaves a comfortable margin on either side. Further, it is possible to remain sufficiently far below the melting point of polypropylene, which is an advantage since heating too close below the melting point causes the disorientation of the molecules, and thus, most of the strength of the fiber is lost. The adhesion between the layers in the laminate film may be further improved, if desired, by incorporating a minor quantity of the other polymer in each layer. For example, one layer may be composed of 95–60 parts by weight of polypropylene and 5–40 parts by weight of polyethylene and the other layer of 95–60 parts by weight of polyethylene and 5–40 parts by weight of polypropylene. It is advantageous if polypropylene, or at least substantially propylene, for one layer of the laminate is used since polypropylene film is easily fibrillated.

In general, the amount of polymer fiber used will be 5–75% by weight, based on the total weight of the paper, but it will be appreciated that the quantity of polymer fiber used depends on the degree to which it is desired to improve the wet strength of the paper. Staple fibers are usually required in a larger quantity than a network or a fleece: normally 20–75% for staple fibers and 5–40% for a network or a fleece. It should be noted that the melting and flowing-out of the lowest melting polymer also improves the water-proofness of the paper.

The various layers of the multilayered film need not be of equal thickness, but one layer may be up to 10 or more times as thick as any other layer.

The process

In the continuous production of paper an aqueous suspension of cellulose fibers (possibly with filler, dye, glue, resin and the like) which is generally from 98 to 99.5% water is formed into a sheet on a Fourdrinier or a cylinder machine where a large proportion of the water is removed by passing over a wire mesh or sieve then through a number of suction boxes. By that time the moisture content has dropped to less than 100% by weight, usually to 65% or slightly less, based on dry substance. The paper subsequently passes a number of heated drying cylinders where further heating takes place to form a sheet of normal moisture content of approximately 8%. If the paper, after passing the last drying cylinder, has a low moisture content, a fine water mist may be sprayed onto the paper. After drying, many types of paper are calendared to obtain a smooth surface.

The process of the invention may be integrated in various ways into this conventional paper making process.

Generally this integration merely involves incorporating polymer fibers obtained by fibrillation of the cold stretched multilayered film comprising two or more layers of different polymer compositions into the cellulosic fibers then heating the temperature above the melting point of the lowest melting polymer and below the melting point of the highest melting polymer. Such an incorporation is generally done in two ways.

The first involves mixing staple polymer fibers with the cellulosic fibers before the wet paper sheet is formed so that an aqueous suspension or slurry of the polymer and cellulosic fibers is formed, the suspension generally being from 0.5 to 2% by weight fibers. After the aqueous slurry of the polymer fibers and the cellulosic fibers is formed, a sheet is formed by any of the usual methods, i.e., using a Fourdrinier or cylinder machine. Generally the polymer fibers will comprise from 5 to 75% by weight of the total weight of fibers and more preferably will be used in a quantity of from 20–75% by weight based on the total weight of fibers. During or after drying (and calendaring, if desired) the heating required according to the invention may be performed, i.e., the sheet is heated to a temperature which is higher than the lowest melting polymer but lower than the highest melting polymer.

A suitable length for the polymer staple fibers is approximately 5–15 mm.; the thickness (corresponding to the thickness of the stretched film) is usually between 5 and 50 microns; the width, which usually varies widely with a film fibrillate, is usually between 20 and 250 microns. By adding filler to the polymer it is possible to influence the specific gravity of the polymer fibers and, if desired, to bring it closer to that of the cellulose fibers, thus reducing the demixing tendency in aqueous suspension.

The second manner in which the broad concept of incorporating polymer fibers may be attained is by introducing the polymer fibers after the wet paper sheet has passed the pressure rolls and has acquired some strength. In this case two paper sheets should be available, the polymer fibers being applied between them. Although here again it is possible to use staple fibers, it is nevertheless much easier to work with a continuous network or fleece. The introduction of the polymer fibers between the wet paper sheets is followed again by the drying step, etc. as indicated above. In this case it is of course also possible to work with three or four paper sheets and two or three intermediate layers of polymer fibers, etc. Alternatively, each intermediate layer of polymer fibers may consist of a plurality of networks placed on each other. The thickness of the fibers (corresponding to the thickness of the stretched film) is usually between 5 and 100 microns; the width is usually between 20 and 150 microns.

In either case it is of advantage for the cellulose fibers to be pressed, as it were, between the polymer fibers during the passage of the drying cylinders (and possibly during calendaring). Thus, separate layers are hardly discernible in the final product.

As pointed out previously a particularly preferred combination for the polymer fibers in either means of incorporation is a multilayered film of polypropylene and low density polyethylene, which have respective melting points of about 170° and 120° C. With this combination a heating temperature of about 130–140° C. is advantageous and is not detrimental to the paper, at least not during the short time required for the heat treatment according to the invention. Naturally, it will not be possible in the latter case to give the heat treatment during the customary drying of the paper, but heating may suitably be effected at a later stage during calendaring. In this case the heat treatment is carried out under a certain pressure, which in general is about 2 to 20 MN/m.$^2$ and preferably about 3–10 MN/m.$^2$ (N being the unit of force known as the Newton-1 kilogram-meter/second and M indicating "mega" or $10^6$).

The second method of incorporation referred to above may also be applied, if desired, to paper sheets which are dry or almost dry, but in this case it is more difficult to achieve commingling of the cellulose fibers and the polymer fibers.

Although in the foregoing reference has only been made to integrating the process of the invention into the continuous paper-making process, it will be appreciated that the process of the invention can mutatis mutandis also be integrated with the discontinuous paper-making process (hand-made paper).

It will be appreciated that the laminate film may contain conventional additive such as stabilizers, fillers and dyes.

To illustrate the manner in which the invention may be carried out the following examples are given. It is to be understood, however, that the examples are for the purpose of illustration only and that the invention is not to be regarded as limited to any of these specific conditions or reactants recited therein. Unless otherwise indicated parts and percentages in the examples are by weight.

EXAMPLE I

For the purpose of preparing a laminate film, comprising two layers, the starting materal used was polypropylene with a melt index of 1.5 and polyethylene with a melt index of 2.0 and a density of 0.925. The film was produced by the blow-extrusion method, one extruder being fed with a mixture of 90 parts by weight of polypropylene and 10 parts by weight of polyethylene and a second extruder being fed with a mixture of 90 parts by weight of polyethylene and 10 parts by weight of polypropylene, both extruders being connected to one extrusion die with a circular opening, in which the two polymer melts become confluent just before leaving the die. By arranging for the two extruders to produce polymer at the same rate, it was ensured that the two layers of the laminate reached the same thickness, namely 30 microns. The extrusion rate was 9 m./min. and after laying flat and slitting of the tubular film, a flat film with a width of 30 cm. was obtained.

This film was subjected to cold stretching in longitudinal direction at a temperature of 80° C. and a stretch ratio of 8:1. During stretching, the total thickness of the film was reduced from 60 to 21 microns.

The stretched laminate film was fibrillated by passing the film over a roll provided with saw blades (see French patent specification 1,556,787). The peripheral speed of the roll was four times as high as the linear speed of the film. The fibrillate obtained had the form of a continuous network.

Four layers of this network were laid on each other and passed collectively between two sheets of wet kraft paper made from sulfate wood pulp, which sheets came from the pressure rolls and had a moisture content of 60%. The two paper sheets and the intermediate fibrillate passed collectively the drying cylinders, which were heated internally with steam to 110° C. After drying, calendaring was effected at 130° C. The product had a weight of 104 g./m.$^2$ and contained 10% by weight of polymer fiber.

For comparison, kraft paper of the same weight was produced by the same method but without using polymer fiber.

TABLE I

|  | With polymer fiber | Without polymer fiber |
| --- | --- | --- |
| Wet tear strength (NEN 1760) g | 159 | 102 |
| Wet bursting strength (NEN 1765) kg./cm.$^2$ | 0.4 | 0.2 |

NOTE.—(NEN=Netherlands Standard).

EXAMPLE II

Use was made of the same fibrillate as in Example I. Staple fiber was made from this continuous network by cutting it into pieces of 10 mm. length.

An aqueous suspension was prepared which contained 2% by weight of fiber material, one-half consisting of the aforesaid staple fiber and the other half of cellulose fiber (sulfate wood pulp). From this suspension kraft paper of 104 g./m.$^2$ was made in the usual manner. Drying and calendaring were effected as indicated in Example I.

For comparison, Kraft paper of the same weight was produced by the same method but without using polymer fiber (consequently the suspension contained 2% by weight of cellulose fiber).

TABLE II

|  | With polymer fiber | Without polymer fiber (41-50) |
| --- | --- | --- |
| Wet tear strength (NEN 1760) g | 365 | 102 |
| Wet bursting strength (NEN 1765) kg./cm.$^2$ | 1.5 | 0.2 |

EXAMPLE III

Sample preparation

The synthetic fiber containing paper samples in this example were made batchwise on small laboratory equipment producing hand sheets. The type of pulp used was an unbleached pine wood sulfate type for kraft paper, having a specific gravity (s.g.) of 1.26. The wood fibers were on average 3.5 mm. long and approximately between 3 and 5 denier.

The test samples were prepared according to the following procedure:

360 grams of sulfate pulp were suspended in 18 liters of water and subjected to the action of a rotating cylinder provided with metal knives (Hollander equipment) during a certain time. The loading of the cylinder was 78.5 Newtons (N) and milling time was about ½ hour. The degree of milling of the pulp mass was kept between 25 and 28° S.R.[1] After milling, the desired amount of film fiber was added to the pulp suspension and after having been mixed by means of a normal type of propeller mixer, diluted to a concentration of 0.5% wt. of the total fiber amount.

The hand sheets were prepared by pouring the diluted cellulose/synthetic fiber mixture into a cylinder with a capacity of 14 liters provided with a fine screen at the bottom for draining off the water. After drainage the wet sheets were pressed between felts at an initial pressure of 98.1 kN/m.$^2$ and subsequently pressed at 1.47 MN/m.$^2$ for further dewatering. The hand sheets thus obtained were dried at 60° C. and conditioned at 20° C. and 65% relative humidity.

In the preparation of each series of paper samples with synthetic fiber a reference of 100% paper was included.

Types of film fiber used

Three different types of film fiber were examined in this example viz, (a) monocomponent polypropylene (PP) film staple fiber without any filler (s.g. 0.91)
(b) bicomponent PP/low density polyethylene (LDPE) film staple fiber of which the PP/LDPE laminate ratio was 1:1 and having a s.g. of 0.91
(c) continuous short network of bicomponent PP/LDPE film fiber as (b).

The amount of monocomponent staple fiber incorporated in the pulp was 10% weight, while the PP fiber length used was 10 mm.

For the bicomponent PP/LDPE film staple fiber the amounts were between 10 and 50% wt. having an average length of 10 mm. The staple fibers and continuous network were made by means of the fibrillation process described in U.S. Pat. 3,500,517.

The average denier of all these film fibers was about 10 g./9000 m.

Post treatment

Contrary to the monocomponent PP fibers, the PP/LDPE bicomponent fibers were more easier heat bonded, the bonding being effected by applying heat and pressure.

The object of post treatment of paper containing PP/LDPE fibers was to obtain a matrix of synthetic fibers in the paper sheet, thus improving especially the wet strength of the product. The temperature applied was higher than the melting point of LDPE which is about 120° C. but lower than the softening temperature of PP (170° C.). The temperature actually employed was between 120–130° C.

The heating of the hand sheets was carried out by pressing the paper sheets between two heated plates under a pressure of 4.9 MN/m.$^2$ and at a pressing time of 5 seconds.

[1] S.R.=Schopper Richler, expressing the degree of milling.

Discussion of results

The results set forth in Table III show the rather surprising results that in all cases where the PP/LDPE fibers were added to the pulp the resulting paper showed a wet tear strength which was greater than the dry tear strength. This is exactly the opposite for the paper with PP fibers incorporated which showed more than a 50% decrease in wet tear strength over dry tear strength.

TABLE III.—DRY AND WET TEAR STRENGTHS OF PAPER SHEETS CONTAINING PP/LDPE FIBER AND PP FIBER

| Composition of paper sheet | Tear strength (N)[1] | |
|---|---|---|
| | Dry | Wet |
| Pulp 100% | 1.18 | 1.02 |
| Pulp plus 10% wt. PP/LDPE fibers | 1.60 | 1.91 |
| Pulp plus 20% wt. PP/LDPE fibers | 2.02 | 2.99 |
| Pulp plus 30% wt. PP/LDPE fibers | 2.37 | 3.43 |
| Pulp plus 50% wt. PP/LDPE fibers | 3.92 | 4.22 |
| Pulp plus 10% wt. PP fiber | 2.20 | 0.98 |

[1] For 100 g./m.$^2$ sheets.

EXAMPLE IV

As in Example I, in this example the film fiber is incorporated into the paper by sandwiching one or more layers of spread continuous bi-component PP/LDPE film fiber network. This method of reinforcing paper has the advantage that the inter-cellulosic fiber structure of the paper is not disturbed and therefore the tensile bursting strength is not adversely affected. This example was carried out with four layers of spread network, representing 10% weight of polyolefin fiber in the paper sheets. Sandwiching was performed by placing the network layers between the paper sheets of about 50 g./m.$^2$ when the latter was still in a wet stage, i.e., containing about 100% weight of water. The remainder of the water was subsequently removed by pressing the sandwich products at 104° C. and after this treatment the sample was examined on the distribution of the network over the paper sheet. It was noted that the sheets had a good thickness distribution. The additional heat treatment at 157° C. under pressure of 4.9 MN/m.$^2$ to fuse the PP/LDPE film fiber network at the points of contact was carried out and the dry/wet tear strength obtained from these samples is summarized as follows.

TABLE IV

| Type of paper sheet | Tear strength (N)[1] | |
|---|---|---|
| | Dry | Wet |
| 100% kraft paper | 1.69 | 1.00 |
| 90% wt. pulp plus 10% wt. PP/LDPE network | 2.38 | 1.56 |
| 90% wt. pulp plus 10% wt. PP/LDPE staple of 10 mm. length | 1.60 | 1.91 |

[1] For 100 g./m.$^2$ sheets.

This method also results in a sheet material which exhibits a greater wet tear strength than a dry tear strength when staple fibers are used, but a lower wet tear strength with a network of PP/LDPE is used.

I claim as my invention:

1. A process for the production of a paper having improved wet strength, said process comprising:
   (a) incorporating from 0.5 to 2% by weight fiber of staple polymer fibers of 5 to 15 millimeters length obtained by fibrillation of a cold-stretched multi-layered film comprising two or more layers of polypropylene and low density polyethylene into cellulosic fibers in random directions so that an aqueous slurry is formed wherein the polymer fibers comprise 20 to 75% by weight of the total fiber mixture,
   (b) forming a wet sheet of the fiber mixture, and (c) heating the wet sheet so formed under pressure at a temperature below the melting of the polypropylene and above the melting point of the low density polyethylene.

2. A paper having improved wet strength comprising
(a) from about 20–75% by weight of staple polymer fibers obtained by fibrillation of a cold-stretched multilayered film comprising two or more layers of polypropylene and low density polyethylene, and
(b) 25–80% by weight cellulosic fibers.

3. The sheet material of claim 2 wherein one layer of the multilayered film is formed from a mixture of 60–95 parts by weight of polypropylene and 5–40 parts by weight polyethylene, and another layer is formed from a mixture of 60–95 parts by weight of polyethylene and 5–40 parts by weight of polypropylene.

References Cited

UNITED STATES PATENTS

| | | | |
|---|---|---|---|
| 3,097,991 | 7/1963 | Miller et al. | 162—157 R |
| 3,500,517 | 3/1970 | Dekker et al. | 264—147 |
| 3,582,418 | 6/1971 | Schuur | 264—Dig. 47 |
| 3,560,318 | 2/1971 | Miller et al. | 162—157 R |
| 2,336,797 | 12/1943 | Maxwell | 162—157 R |
| 3,394,047 | 7/1968 | Sommer et al. | 162—146 |
| 2,881,072 | 4/1959 | Clark | 162—132 |

S. LEON BASHORE, Primary Examiner

W. F. SMITH, Assistant Examiner

U.S. Cl. X.R.

162—129, 157 R